(12) United States Patent
Lee

(10) Patent No.: US 8,070,326 B2
(45) Date of Patent: Dec. 6, 2011

(54) FREE-FORM LENS DESIGN TO APODIZE ILLUMINANCE DISTRIBUTION

(75) Inventor: Junwon Lee, Peabody, MA (US)

(73) Assignee: Osram Sylvania Inc., Danvers, MA (US)

( * ) Notice: Subject to any disclaimer, the term of this patent is extended or adjusted under 35 U.S.C. 154(b) by 148 days.

(21) Appl. No.: 12/712,610

(22) Filed: Feb. 25, 2010

(65) Prior Publication Data

US 2011/0164426 A1 Jul. 7, 2011

Related U.S. Application Data

(60) Provisional application No. 61/292,885, filed on Jan. 7, 2010.

(51) Int. Cl.
*F21V 7/00* (2006.01)

(52) U.S. Cl. .................... 362/307; 362/308; 362/311.02; 362/311.09; 362/326; 359/738

(58) Field of Classification Search .................. 362/307, 362/308, 309, 311.01, 311.02, 311.09, 311.1, 362/326; 359/642, 738, 741
See application file for complete search history.

(56) References Cited

U.S. PATENT DOCUMENTS

| 5,924,788 | A | 7/1999 | Parkyn, Jr. |
| 7,273,299 | B2 | 9/2007 | Parkyn et al. |
| 7,599,326 | B2 * | 10/2009 | Watson .......................... 370/329 |
| 7,837,349 | B2 * | 11/2010 | Chinniah et al. ............... 362/244 |
| 7,974,018 | B2 * | 7/2011 | Braune et al. .................. 359/796 |
| 7,993,036 | B2 * | 8/2011 | Holder et al. ............ 362/311.02 |

OTHER PUBLICATIONS

Wei Tai et al., Design of an aspherical lens to generate a homogenous irradiance for three-dimensional sensors with a light-emitting diode source, Applied Optics, Nov. 1, 2000, pp. 5801-5805, vol. 39 No. 31, Optical Society of America, Washington D.C.
Yi Ding et al., Freeform LED lens for uniform illumination, Optics Express, Aug. 18, 2008, pp. 12958-12966, vol. 16 No. 17, Optical Society of America, Washington D.C.

* cited by examiner

*Primary Examiner* — Ali Alavi
(74) *Attorney, Agent, or Firm* — Shaun P. Montana

(57) ABSTRACT

A lens that angularly redistributes light from an LED is disclosed. The desired illuminance (power per area) pattern for an LED/lens combination has a relatively flat center, a knee, and a gradual tail. By overlapping adjacent combinations' tails, the resulting illuminance pattern may be generally uniform, with relatively loose tolerances on LED/lens placement and performance. The lens has a proximal face with a concave spherical indentation with its center at the light source. The lens's distal face has a "center thickness" (CT) on-axis, a peak thickness away from a longitudinal axis of about 1.0 to 1.2 times the CT, a radius at which the peak thickness occurs of about 0.5 to 1.0 times the CT, a radius at which the thickness returns to the CT of about 1.1 to 1.5 times the CT, and a radius (maximum lateral extent) of the lens of about 1.6 to 1.9 times the CT.

19 Claims, 10 Drawing Sheets

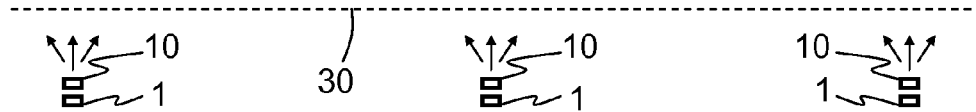
Fig. 1
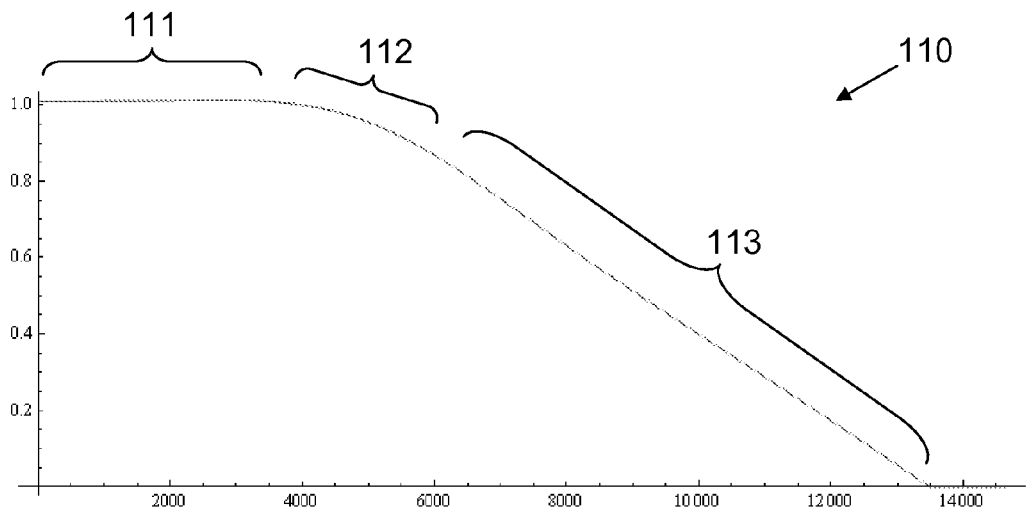
Fig. 2
Fig. 3

| Beam angle incoming [deg] | Beam angle outgoing [deg] | Lens data point Y [mm] | Lens data point Z [mm] |
| --- | --- | --- | --- |
| 0 | 0 | 0 | 1 |
| 5 | 12.933 | 0.0882 | 1.0081 |
| 10 | 24.621 | 0.1813 | 1.0286 |
| 15 | 34.349 | 0.2826 | 1.0549 |
| 20 | 42.103 | 0.3933 | 1.0808 |
| 25 | 48.216 | 0.5135 | 1.1013 |
| 30 | 53.082 | 0.6423 | 1.1125 |
| 35 | 57.034 | 0.7781 | 1.1112 |
| 40 | 60.314 | 0.9185 | 1.0946 |
| 45 | 63.082 | 1.0603 | 1.0603 |
| 50 | 65.438 | 1.1992 | 1.0063 |
| 55 | 67.449 | 1.3303 | 0.9315 |
| 60 | 69.165 | 1.4477 | 0.8358 |
| 65 | 70.635 | 1.5456 | 0.7207 |
| 70 | 71.917 | 1.6184 | 0.589 |
| 75 | 73.097 | 1.6621 | 0.4453 |

FREE-FORM LENS DESIGN TO APODIZE ILLUMINANCE DISTRIBUTION

CROSS-REFERENCE TO RELATED APPLICATIONS

The present application claims priority to U.S. Provisional Patent Application No. 61/292,885, filed on Jan. 7, 2010 and entitled "Free-Form Lens Design to Apodize Illuminance Distribution", the entirety of which is hereby incorporated by reference.

TECHNICAL FIELD

The present invention is directed to a lens that can angularly redistribute the optical power emitted from a light emitting diode to achieve a desired distribution at an observation plane.

BACKGROUND

In recent years, light emitting diodes (LEDs) have emerged as efficient, inexpensive, long-lasting light sources that produce little heat and require little maintenance. LEDs have been quickly adopted for applications that use colored light, such as red, yellow and green traffic lights, and are making inroads for illumination applications that use generally white light.

A good application for white-light LEDs is overhead street lighting, where LEDs mounted in downward-facing fixtures at the top of a series of poles illuminate the street below. The light output from LEDs is fairly directional, so that if bare LEDs were mounted in the fixtures and pointed downward, the bottom of the light poles would be significantly brighter than the street area between the poles.

Accordingly, there exists a need for an optic, preferably a lens, which can redistribute the light output from each LED, so that light from a series of the overhead-mounted LEDs and optics produces a more uniform illuminance at the street level. Such an optic may be used in other applications that require generally uniform illuminance at an observation plane from a series of discrete point-like sources laterally spaced away from the observation plane.

SUMMARY

Embodiments of the present invention provide a lens that angularly redistributes the light from a light emitting diode (LED), so that a series of laterally-spaced-apart LED/lens combinations can produce a generally uniform light distribution at an observation plane a particular longitudinal distance away from the LED/lens combinations. The desired illuminance (power per area) pattern for an LED/lens combination has a relatively flat center, a knee, and a gradual tail. By overlapping the tails of adjacent LED/lens combinations, the resulting illuminance pattern may be generally uniform, with relatively loose tolerances on LED/lens placement and performance. An exemplary lens, made from COP, has dimensions as follows. A proximal face of the lens has a concave spherical indentation with its center at the light source. A distal face of the lens has a "center thickness" on-axis, a peak thickness away from the longitudinal axis of about 1.0 to 1.2 times the center thickness, a radius at which the peak thickness occurs of about 0.5 to 1.0 times the center thickness, a radius at which the thickness returns to the center thickness of about 1.1 to 1.5 times the center thickness, and a radius (or maximum lateral extent) of the lens of about 1.6 to 1.9 times the center thickness.

In an embodiment, there is provided an optical system to angularly redistribute light from a light source, the light source defining a longitudinal axis. The optical system includes a lens having a proximal face and a distal face. The distal face is opposite the proximal face and has a local maximum distal indentation coincident with the longitudinal axis. The proximal face includes a concave spherical indentation having its center at the light source. The lens has a central thickness defined as the longitudinal separation between the light source and the local maximum distal indentation. A radial cross-sectional slice of the distal face has a maximum distal protrusion spaced away from the longitudinal axis by a distance between 0.5 times the central thickness and 1.0 times the central thickness. At the maximum distal protrusion, the lens has a peak thickness defined as the longitudinal separation between the light source and the maximum distal protrusion, wherein the peak thickness is between 1.0 times the central thickness and 1.2 times the central thickness. A radial cross-sectional slice of the distal face has a location laterally coplanar with the local maximum distal indentation and spaced away from the longitudinal axis by a distance between 1.1 times the central thickness and 1.5 times the central thickness. The lens has a maximum lateral extent, from the longitudinal axis, between 1.6 times the central thickness and 1.9 times the central thickness. The lens receives light from the light source, then refracts the light through the proximal face of the lens, then transmits the light through the lens directly to the distal face of the lens, and then refracts the light through the distal face and out of the lens.

In a related embodiment, the lens may have a refractive index of 1.532 at a wavelength of 550 nm. In another related embodiment, the lens may be made from COP. In yet another related embodiment, a radial cross-sectional slice of the distal face may have a maximum distal protrusion spaced away from the longitudinal axis by a distance between 0.6 times the central thickness and 0.9 times the central thickness. In still another related embodiment, a radial cross-sectional slice of the distal face may have a maximum distal protrusion spaced away from the longitudinal axis by a distance between 0.6 times the central thickness and 0.8 times the central thickness. In yet still another related embodiment, a radial cross-sectional slice of the distal face may have a maximum distal protrusion spaced away from the longitudinal axis by a distance between 0.65 times the central thickness and 0.75 times the central thickness.

In still yet another related embodiment, the peak thickness may be between 1.1 times the central thickness and 1.2 times the central thickness. In yet another related embodiment, the peak thickness may be between 1.10 times the central thickness and 1.15 times the central thickness. In yet still another related embodiment, the peak thickness may be between 1.10 times the central thickness and 1.12 times the central thickness.

In yet another related embodiment, a radial cross-sectional slice of the distal face may have a maximum distal protrusion spaced away from the longitudinal axis by a distance between 0.6 times the central thickness and 0.9 times the central thickness. In still yet another related embodiment, a radial cross-sectional slice of the distal face may have a maximum distal protrusion spaced away from the longitudinal axis by a distance between 0.6 times the central thickness and 0.8 times the central thickness. In yet still another related embodiment, a radial cross-sectional slice of the distal face may have a maximum distal protrusion spaced away from the longitudinal axis by a distance between 0.65 times the central thickness and 0.75 times the central thickness. In still yet another related embodiment, a radial cross-sectional slice of the distal face may have a location laterally coplanar with the local maximum distal indentation and spaced away from the longitudinal axis by a distance between 1.2 times the central thickness and 1.5 times the central thickness.

In yet another related embodiment, a radial cross-sectional slice of the distal face may have a location laterally coplanar with the local maximum distal indentation and spaced away from the longitudinal axis by a distance between 1.25 times the central thickness and 1.45 times the central thickness. In another related embodiment, a radial cross-sectional slice of the distal face may have a location laterally coplanar with the local maximum distal indentation and spaced away from the longitudinal axis by a distance between 1.3 times the central thickness and 1.4 times the central thickness.

In yet another related embodiment, the lens may have a maximum lateral extent, from the longitudinal axis, between 1.7 times the central thickness and 1.8 times the central thickness. In still another related embodiment, the lens may have a maximum lateral extent, from the longitudinal axis, between 1.65 times the central thickness and 1.7 times the central thickness. In yet another related embodiment, the proximal face may be rotationally symmetric about the longitudinal axis. In still yet another related embodiment, the distal face may be rotationally symmetric about the longitudinal axis.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 1 is a general schematic drawing of the geometry of the light sources, lenses and observation plane according to embodiments disclosed herein.

FIG. 2 is an exemplary equation representing a smoothly-varying illuminance pattern from a single source according to embodiments disclosed herein.

FIG. 3 is an exemplary plot of calculated illuminance (power per area) versus lateral distance along the observation plane, for a single source according to embodiments disclosed herein.

FIG. 8 is an exemplary mapping table, produced from the data of FIG. 7.

DETAILED DESCRIPTION

Figure 4:
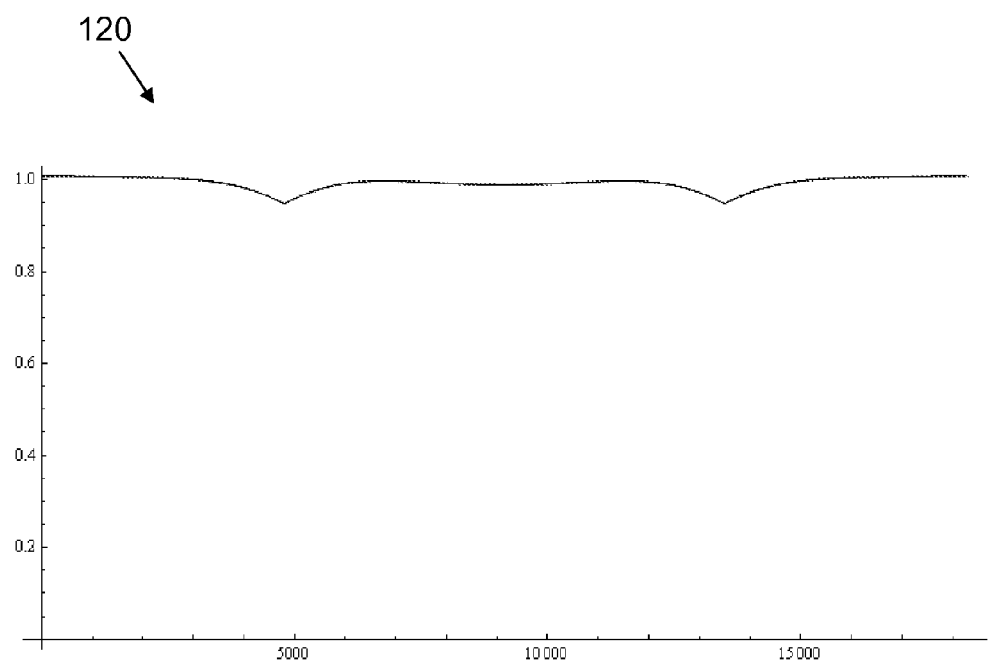
FIG. 4 is an exemplary plot of calculated illuminance (power per area) versus lateral distance along the observation plane, for three spaced-apart sources according to embodiments disclosed herein.

FIG. 1 is a general schematic drawing of the geometry of the light sources, lenses and observation plane according to embodiments disclosed herein. As used herein, the term light emitting diode (LED) refers to any solid state lighting source, including LED, organic light emitting diode (OLED), and the like. Light from a series of light sources 1, such as LEDs, passes through a series of corresponding lenses 10 and strikes an observation plane 30. One possible application that uses this geometry is street lighting, where the LEDs and accompanying optics are mounted overhead and are pointed downward toward a street/sidewalk/parking lot/surface. Note that while street lights generally shine downward, light propagates generally upward in some of the figures in this document.

Embodiments described herein desire to maximize an area coverage having an illuminance above a particular threshold (often in units of foot-candles). A smooth illuminance variation should result, that avoids sharp transitions between relatively bright and relatively dark regions. Roughly uniform illuminance over an arbitrarily large or arbitrarily shaped area may be achieved by overlapping individual illuminance patterns, where each individual pattern has illuminance that varies smoothly.

An advantage of stitching together patterns with smooth illuminance variation, compared to stitching together uniform (or so-called "flat-top") patterns, is that the tolerances are much more forgiving. Any slight misalignments between the stitched-together patterns lead to very slight changes in illuminance, rather than abrupt dark bands or light bands appearing in the illuminance.

Mathematically, uniformity of a particular area may be defined as the average energy per area, divided by the minimum energy per area, within the particular area. For many illumination applications, energy per area is typically specified in units of foot candle, although any suitable unit may alternatively be used.

When multiple sources are spaced apart by six times the distance to the source (i.e., for the geometry of FIG. 1, the horizontal spacing between the sources is six times the distance between the sources and the observation plane), the desired uniformity is less than ten, and preferably, less than five. It will be understood that other suitable design criteria may be used, both in terms of the longitudinal/lateral spacing ratio and the maximum/minimum uniformity values.

In many cases, and for the simulations presented in this document, the multiple sources are arranged in a line, much like street lights along one side of a street. There may be other possible geometries for the sources, such as but not limited to a rectangular grid, or a triangular or hexagonal pattern. Any of these alternative geometries may use methodologies similar to those presented for the linear geometry.

To achieve desired characteristics/design goals, a mathematical expression is chosen to represent the smoothly-varying illuminance pattern from a single source. FIG. 2 includes such an expression 100. The left-hand side of the equation in FIG. 2 is illuminance 101. The right-hand side of the equation includes three terms 102, 103, 104. The first term 102 is a cosine expression, which has a centered peak about an origin (t=0) with a value of one, and falls off gradually and symmetrically on either side of the peak. The values of parameters $\theta_{0.3}$ and $r_{0.3}$ are chosen so that the cosine is suitably wide; only the central portion of the cosine variation is desired to be used, with no use here for the periodic variations that occur far away from the origin. The second 103 and third 104 terms are Gaussians, with peaks that are centered to the right (t=β) and left (t=β) of the origin, respectively. Parameter κ controls the width of the Gaussians, and parameter α controls the amplitude of the Gaussians. It will be understood that one of ordinary skill in the art will be able to manipulate the parameters in equation 100 to produce a smoothly-varying illuminance 101 of any desired shape.

A particularly desirable shape for achieving the design goals is shown in a plot 110 of FIG. 3. The horizontal axis is lateral distance along the observation plane, with the origin (zero) corresponding to the point longitudinally in front of the source. The units are arbitrary. The vertical axis is illuminance (power per area), normalized to unity on-axis. Note that only half the horizontal axis is shown; the other half is a mirror-image of the half that is shown. The shape has three distinct regions. Region 111, near the origin, is generally flat. Region 112, adjacent to the flat region 111, is a so-called "knee". Region 113, adjacent to the "knee", shows a gradual decrease in illuminance.

The benefits of such a shape become readily apparent when the illuminance from three spaced-apart sources is overlapped, as shown in a plot 120 of FIG. 4. Slight dips in illuminance are seen halfway between the sources, and relatively flat illuminance is seen everywhere else. The dips in illuminance are on the order of 10% or 20%, which is relatively small for most illumination applications. Note that the alignment tolerances for this illumination shape are relatively loose. In other words, if the sources are misplaced or are moved laterally from their optimal locations, the effects on the plot 120 are relatively minimal. This is due to the smooth falloff of the illuminance profile for each source.

Figure 5:
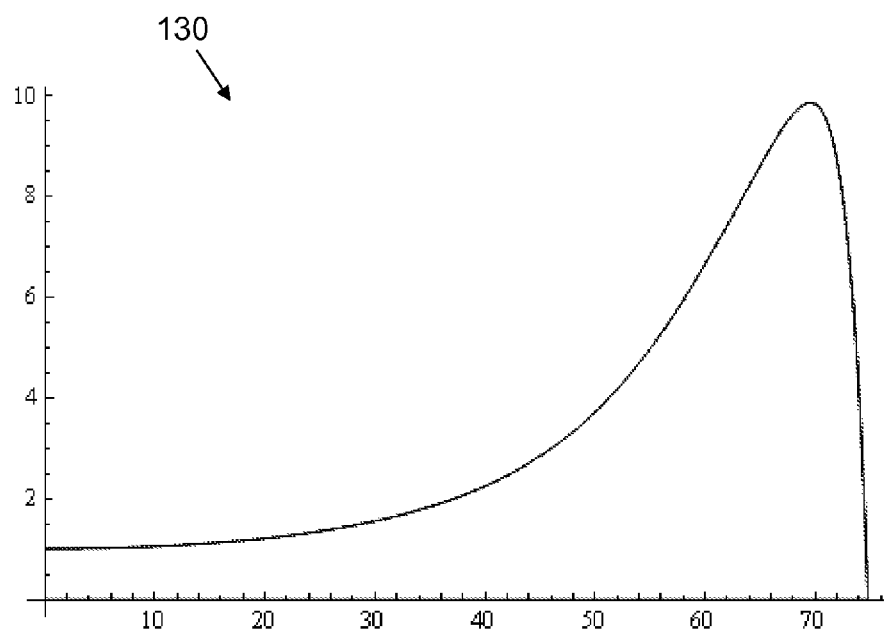
FIG. 5 is an exemplary plot of calculated desired radiant intensity (power per angle) versus propagation angle, for a single source according to embodiments disclosed herein.

Next, the desired illuminance (power per area) curve 110 of FIG. 3 is converted into a desired radiant intensity (power per angle) curve 130, as shown in FIG. 5. The horizontal axis is propagation angle in degrees, where zero degrees corresponds to traveling longitudinally (perpendicular to the observation plane) and 90 degrees corresponds to traveling laterally (parallel to the observation plane). The vertical axis is radiant intensity (power per angle), normalized to unity on-axis. Note that in order to produce the desired illuminance curve (110 in FIG. 3), there must be significantly more power propagating at around 70 degrees than at normal incidence, by roughly a factor of 10 because the area covered by the subtended angle grows exponentially for large angles. In other words, nearly uniform illuminance requires more energy to be sent at the higher angles. The curve in FIG. 5 grows as $(1/\cos^2 \theta)$ for angles $\theta$ up to 70 degrees.

With a desired radiant intensity curve 130 from FIG. 5, the radiant intensity curve of an LED source may be examined, and an optic, preferably a lens, may be designed that can modify the LED radiant intensity curve to look like the desired radiant intensity curve. The curves may be calculated by having the lens perform a one-to-one mapping of a cumulative integral of the flux.

Figure 6:
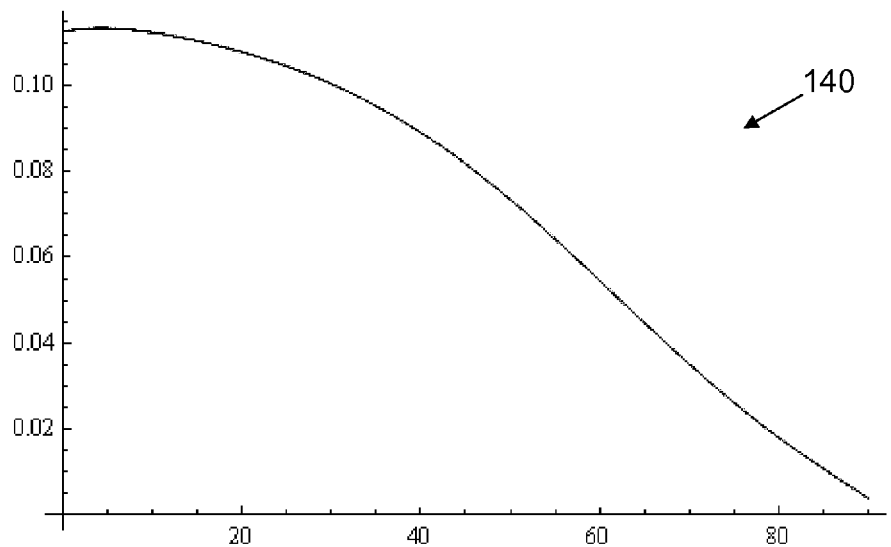
FIG. 6 is an exemplary plot of a typical radiant intensity (power per angle) versus propagation angle, for a bare light emitting diode according to embodiments disclosed herein.
Figure 7:
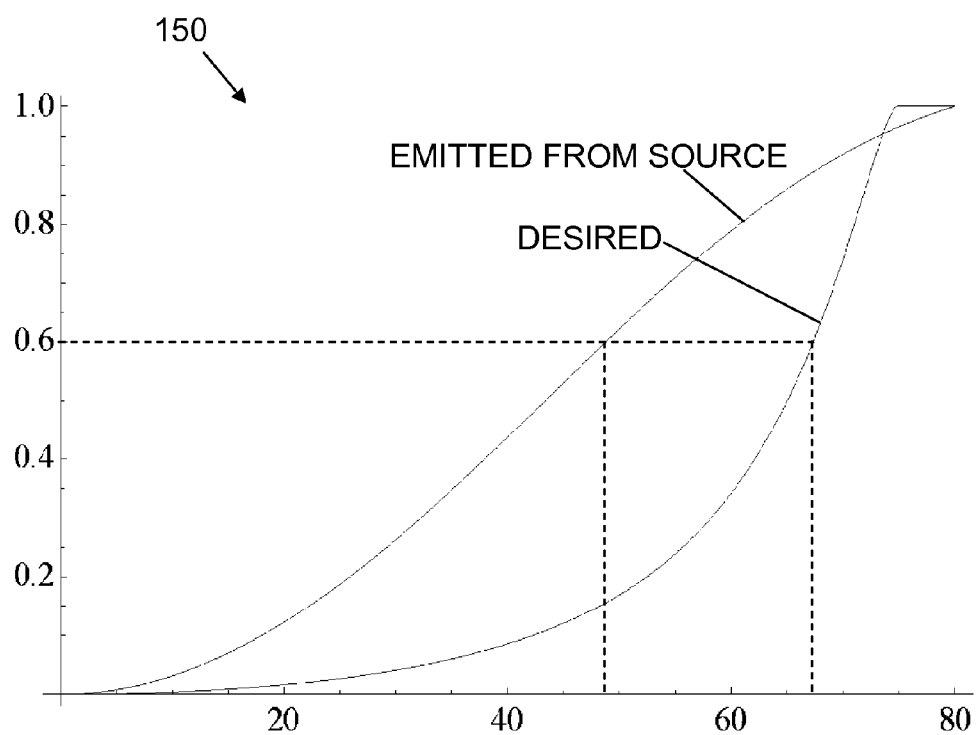
FIG. 7 is an exemplary plot of cumulative flux integrals for both a desired profile and an actual profile emitted from a light bare source according to embodiments disclosed herein.

FIG. 6 shows a typical plot 140 of radiant intensity (power per angle) for a light source, such as an LED. Most of the power emitted from an LED generally follows a Lambertian distribution. A cumulative flux integral is then performed for both the desired curve and the LED curve, and a resultant plot 150 is shown in FIG. 7. These curves represent the fraction of power that is propagating between zero degrees (normal to the observation plane) and the angle listed on the horizontal axis, compared to the total amount of power. Note that this cumulative flux integral is performed in two dimensions, and that rotational symmetry is assumed; this is not necessary for the calculations, but it simplifies the mathematics. The behavior of the curves is reasonable. Both are expected to start off at zero at 0 degrees, and rise to unity at or before 90 degrees. By matching the same cumulative flux value, it is possible to build a one-to-one mapping table between the source propagation angle and the desired propagation angle. For example, for a cumulative flux value of 0.6, a source beam propagation angle of roughly 48 degrees should be converted to a desired beam propagation angle of roughly 67 degrees. These particular values are noted by the dashed lines in FIG. 7. To build the full mapping table, one repeats this process for many or all values of the cumulative flux between 0 and 1.

FIG. 8 is an exemplary mapping table, produced from the data of FIG. 7. The incoming and outgoing angles are with respect to a surface normal to the observation plane. The numerical data points describe a lens surface profile that converts an incoming beam angle into an outgoing beam angle. The "Y" coordinate is lateral, parallel to the observation plane. The "Z" coordinate is longitudinal, perpendicular to the observation plane. It will be understood that the tabulated values in FIG. 8 are dependent on the refractive index of the lens. For this particular example, the lens material is Cyclo Olefin Polymer, COP, with a refractive index of 1.532 at a wavelength of 550 nm. It will also be understood that such a table may be generated for any suitable lens material, having any suitable refractive index.

For this example, COP is chosen because of its low humidity absorption, high optical transmission, and good material flow (for molding). Other possible materials include polycarbonate, Polymethylmethacrylate (PMMA), and silicon. In general, any transparent polymeric material may be used, so that the lens may be manufactured by injection molding or extrusion. In other cases, the lens may be manufactured by diamond turning, etching, or more conventional grinding and polishing techniques, and may use any suitable optical glass or plastic.

Figure 9:
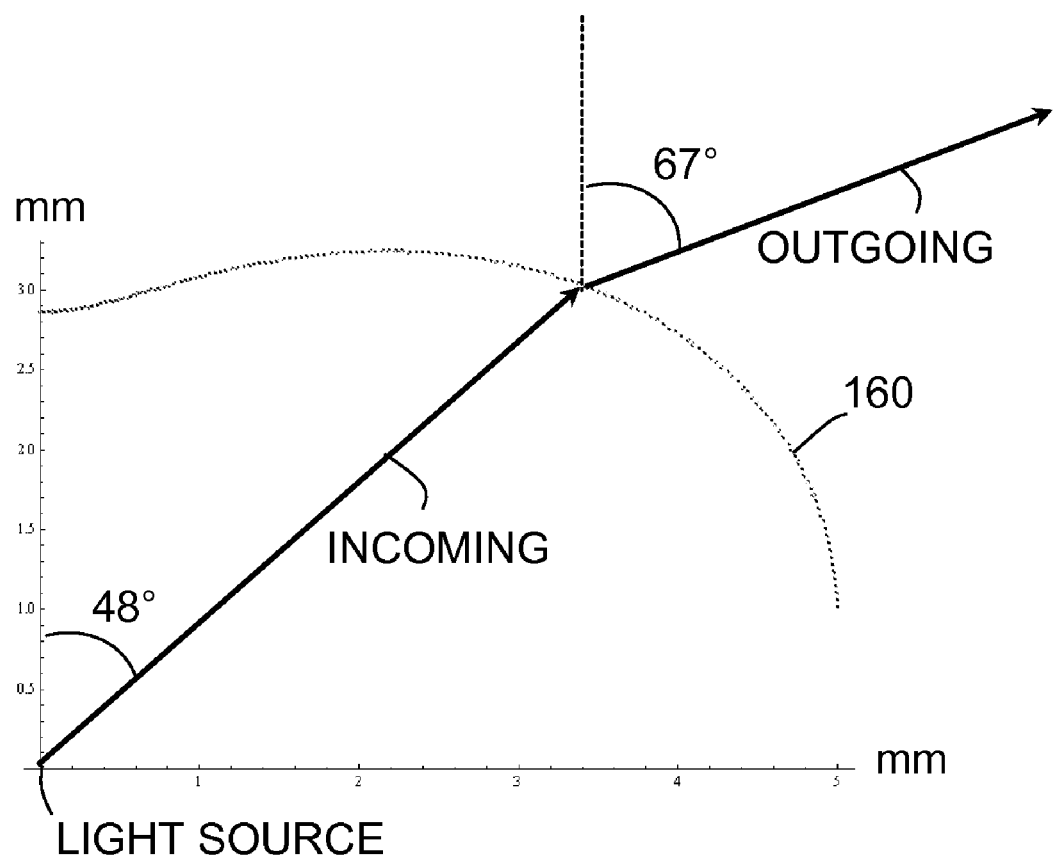
FIG. 9 is a schematic drawing of a single surface that uses Snell's Law to change beam angles according to embodiments disclosed herein.

To show how the source beam propagation angle of 48 degrees is converted into a desired beam propagation angle of 67, FIG. 9 is a schematic drawing of a single surface 160 that uses Snell's Law to change the beam angles. An incoming ray is drawn approaching the surface, and an outgoing ray is drawn leaving the surface. The numerical angles are shown, with respect to a surface normal that is perpendicular to the observation plane (and not necessarily perpendicular to the surface in the drawing). Note that Snell's Law applies at the local slope of the surface through which refraction occurs. Snell's Law dictates that product of the refractive index before refraction and the sine of the angle of incidence (made with respect to a surface normal perpendicular to the refracting surface) is equal to the product of the refractive index after refraction and the sine of the angle of exitance (also made with respect to a surface normal perpendicular to the refracting surface).

By considering Snell's Law at each point along the surface, from the on-axis point at the left end of the plot in FIG. 9 to the edge of the surface at the right end of the plot, a profile of a surface that converts the LED emission to the desired emission may be obtained. Basically, if an LED source is used in combination with the surface shown in FIG. 9, then the slowly-varying illuminance curve shown in FIG. 3 may be obtained. If several of these LED/surface combinations are placed along a line, with proper lateral and longitudinal spacing, then generally uniform illuminance along the observation plane may be obtained.

Figure 10:
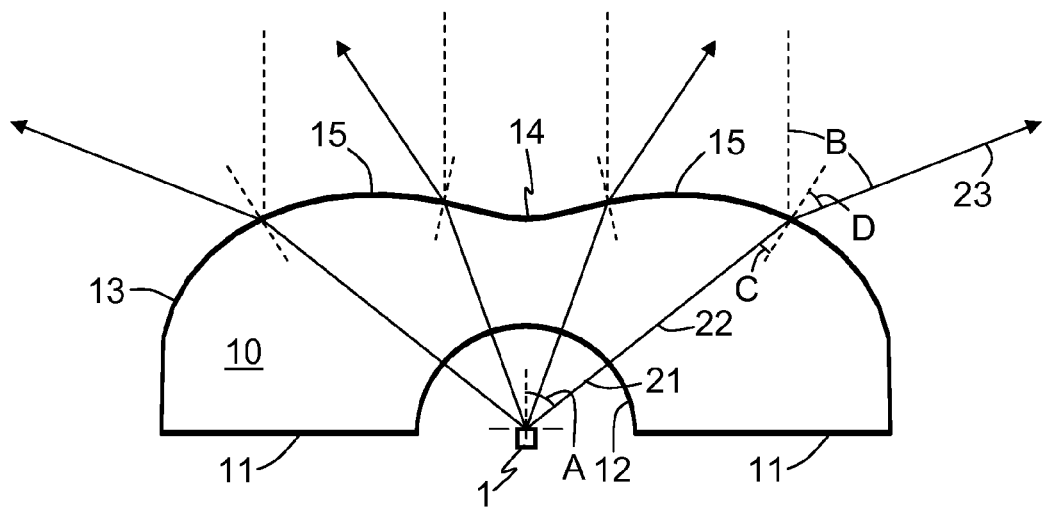
FIG. 10 is a schematic drawing of the lens, a point-source of light, and several representative light rays according to embodiments disclosed herein.

FIG. 10 is a schematic drawing of the lens 10, a light source 1, such as an LED, and several representative light rays leaving the LED, entering the lens 10 and exiting the lens 10. Note that the light source may be a point-source, and is directional, with a peak power directed along a particular longitudinal axis, and a particular angular falloff with increasing angle from that longitudinal axis. A typical specification is angular width, which may be specified as a full-width-at-half-maximum (FWHM), a full- or half-width to a $1/e^2$ point in intensity, or any other suitable measure of beam width. The beam width may be specified in one-dimension for a rotationally symmetric source, or may be specified along two orthogonal directions for a non-rotationally symmetric source. The lens 10 receives light emitted by the light source 1, then refracts the light through a proximal face 11 (also referred to herein as a proximal side 11) of the lens 10, then transmits the light through the lens 10 directly to a distal face 13 (also referred to herein as a distal side 13) of the lens 10 opposite the proximal face 11, and then refracts the light through the distal face 13 and out of the lens 10. The proximal face 11 or proximal side 11 of the lens 10 faces the light source. The distal face 13 or distal side 13 of the lens faces away from the light source.

In some embodiments, any light that enters the proximal side 11 transmits through the lens 10 and directly exits the distal side 13. In these embodiments, light refracts at both surfaces, and there is no total internal reflection within the lens. In other embodiments, there may alternatively be one or more total internal reflections for some rays within the lens.

The proximal side 11 of the lens 10 includes a concave portion 12 or a concave spherical indentation 12, which may be a hemisphere or a portion of a sphere. The light source 1 is placed at the center of the concave portion 12, so that light leaving the light source 1 strikes the concave portion 12 at normal incidence everywhere, and therefore does not change direction upon refraction through the concave portion 12 into the lens 10. The remainder of the proximal side 11 of the lens 10, outside of the concave portion 12, does little to affect performance of the lens, since light rays leaving the light source 1 do not strike this portion of the proximal side 11. As a result, the proximal side 11 may be tailored to suit mechanical concerns, such as providing a reference surface for mounting of the light source 1, or providing mechanical clearance for other elements or components, and so forth.

The distal side 13 of the lens 10 includes an on-axis concave depression 14, at which point the longitudinal thickness of the lens 10 is a local minimum. The on-axis concave depression 14 may be referred to as a local maximum distal indentation 14. A "center thickness", as used below, is defined as the on-axis distance between the center of the concave portion 12 and the concave depression 14 in the distal surface 13, or, equivalently, the longitudinal separation between the light source 1 and the local maximum distal indentation 14. Away from the on-axis depression 14 the surface protrudes away from the light source 1 until it reaches a convex ridge 15. Note that because the lens 10 is rotationally symmetric, the convex ridge 15 is actually a circle that surrounds the optical axis of the lens 10. In other words, a radial cross-sectional slice of the distal face 13 has a maximum distal protrusion spaced away from the longitudinal axis by a particular distance. Along this convex ridge 15, the lens 10 achieves a "peak thickness", which is defined as the longitudinal separation between the plane that includes the center of the concave portion 12 and the convex ridge 15 in the distal surface of the lens 10, or, equivalently, the longitudinal separation between the light source 1 and the maximum distal protrusion.

There is a particular location on the distal face, radially beyond the peak thickness location, where the lens thickness returns to the center thickness. Specifically, a radial cross-sectional slice of the distal face has a location laterally coplanar with the local maximum distal indentation and spaced away from the longitudinal axis by a particular distance. The lens 10 also has a particular maximum lateral extent, from the longitudinal axis. The lens diameter is twice this maximum lateral extent. In some embodiments, the proximal face 11 and the distal face 13 of the lens 10 are both rotationally symmetric about the longitudinal axis of the lens 10.

It will be understood that the sharp edge between the proximal 11 and distal 13 surfaces, as drawn in FIG. 10, may optionally be rounded or tapered as needed. In general, the proximal surface 11 includes enough surface area to fully collect the light emitted from the light source 1, and the distal surface 13 include enough surface area to refract out of the lens 10 all the light that enters the proximal surface 11.

FIG. 10 also includes four exemplary rays that emerge from the light source 1 and transmit through the lens 10. The rightmost ray is denoted with element numbers and labeled with angles, and it will be understood that suitable element numbers and angles may be applied to any of the other rays as well. Ray 21 emerges from the light source 1 at angle A, where A may vary between −90 and +90 degrees. For an LED light source, the light output peaks at 0 degrees, and falls off as the angle A approaches +/−90 degrees. (See FIG. 6.) Relatively little light is emitted beyond around +/−75 degrees. In the tabulated data in FIG. 8, the first column, "Beam angle incoming", corresponds to angle A. Ray 21 strikes the concave portion 12 of the proximal surface 11 at normal incidence, or very nearly normal incidence, so that upon refraction through the surface, the direction of the ray experiences very little change. As a result, ray 22 inside the lens 10 travels along nearly the same direction as ray 21, which is at angle A. This statement is generally valid if the size of the light source 1 is relatively small compared to the size of the lens 10. When ray 22 strikes the distal side 13 of the lens 10, it undergoes refraction at the distal surface 13 and changes direction in accordance with Snell's Law, as described above. The angles that are relevant to Snell's Law are angles C and D in FIG. 10, which are shown with respect to a local surface normal. Snell's Law dictates that the sine of angle D equals product of the refractive index of lens 10 with the sine of angle C. The ray 23 that exits the lens 10 forms an angle B, with respect to the longitudinal (on-axis) direction. (Note that this on-axis direction is a surface normal with respect to the observation plane, and is not a surface normal with respect to the distal surface of the lens.) This angle B corresponds to the second column of data in FIG. 8, "Beam angle outgoing".

Note that either of both surfaces of the lens may optionally be anti-reflection coated, such as with a suitable single- or multi-layer dielectric thin film. Such a thin film coating may reduce the reflections generated at each interface between the lens material and air. Without an anti-reflection coating, the reflection at each interface may be around 4%; with an anti-reflection coating, the reflection may be less than 1%, and is typically less than 0.5%.

Figure 11:
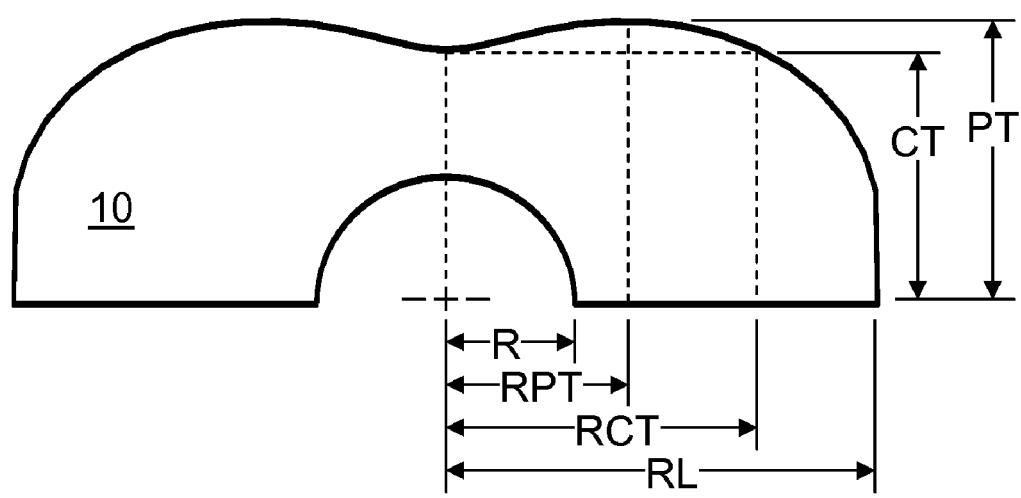
FIG. 11 is a dimensioned schematic drawing of the lens according to embodiments disclosed herein.

FIG. 11 is a dimensioned schematic drawing of the lens 10. In some embodiments, the lens may be scaled up or down without significantly altering its first-order performance. For that reason, the ranges provided herein are expressed in terms of the center thickness of the lens. Note that the manufacturing tolerances of the lens generally do not scale up or down along with the lens size. As a result, a large-scaled version of the lens may be harder to manufacture and/or align than a small-scaled version of the lens, because the same surface quality must be maintained over a larger surface area. One of ordinary skill in the art will readily appreciate the scaling of tolerances, and will size the lens appropriately.

The "center thickness" of the lens is denoted as CT. The "peak thickness" of the lens is denoted as PT. Preferred ranges for the peak thickness include 1.0 to 1.2 times the center thickness, 1.1 to 1.2 times the center thickness, 1.10 to 1.15 times the center thickness, and 1.10 to 1.12 times the center thickness. In general, the larger the peak thickness, the more uniform the light distribution. However, the larger the peak thickness, the more difficult the lens is to manufacture and the more undesirable Fresnel loss occurs. The radius at which the peak thickness occurs is denoted as RPT. Preferred ranges for RPT include 0.5 to 1.0 times the center thickness, 0.6 to 0.9 times the center thickness, 0.6 to 0.8 times the center thickness, and 0.65 to 0.75 times the center thickness. The radius at which the thickness returns to the center thickness is denoted as RCT. Preferred ranges for RCT include 1.0 to 1.5 times the center thickness, 1.1 to 1.5 times the center thickness, 1.2 to 1.5 times the center thickness, 1.25 to 1.45 times the center thickness, and 1.3 to 1.4 times the center thickness. The radius (or maximum lateral extent) of the lens is denoted as RL. Preferred ranges for RL include 1.6 to 1.9 times the center thickness, 1.7 to 1.8 times the center thickness, and 1.65 to 1.7 times the center thickness. The radius of the hemispherical or partially spherical portion is denoted as R. In general, the value of R does not impact the first-order performance of the lens. As a result, R may be varied as needed to ensure good mechanical characteristics for the manufacturing and alignment of the lens. Some ranges for R may include 0 to 1 times the center thickness, 0.2 to 0.8 times the center thickness, and 0.4 to 0.6 times the center thickness.

Note that the above ranges are obtained for a lens material of COP, with a refractive index of 1.532 at a wavelength of 550 nm. If other materials with different refractive indices are used, the whole process may be repeated with the new refractive index; there will be different values in the second, third and fourth columns of the table in FIG. 8, and an appropriate surface profile that performs the mapping in FIG. 7.

Figure 12:
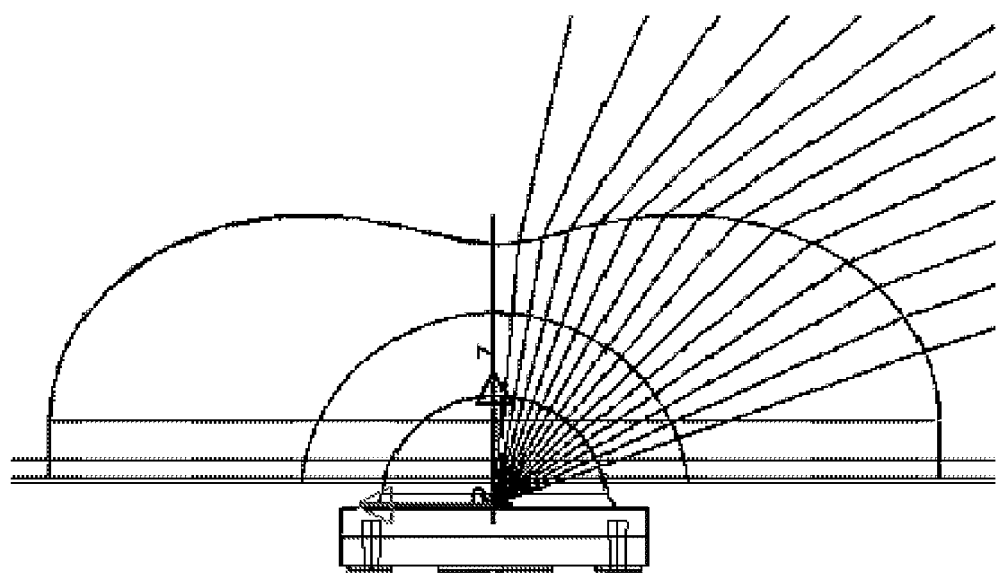
FIG. 12 is a side-view schematic drawing of the lens according to embodiments disclosed herein entered into a raytracing program.

To confirm that the lens 10 shown schematically in FIG. 11, and shown numerically in FIG. 8, performs as designed, the surface profile was entered into a raytracing computer program. Such raytracing programs are well-known and are commercially available. Such commercially available programs include LightTools, Oslo, Zemax, Code V, ASAP, and others. FIG. 12 is a side-view schematic drawing of the lens entered into a raytracing program. Here, the "Y" axis is horizontal and the "Z" axis is vertical, which is consistent with the surface profile data presented in FIG. 8. The rays for the right half-plane are shown leaving the source, refracting into the lens and refracting out of the lens. Rays are shown in increments of 5 degrees, from 0 to 70 degrees, corresponding to the values in the leftmost column of FIG. 8.

Figure 13:
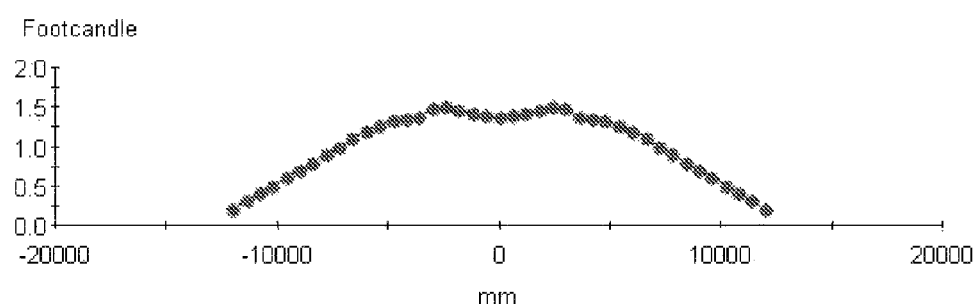
FIG. 13 is a plot of illuminance at the observation plane, taken as a slice through the on-axis point, for a single LED/lens combination according to embodiments disclosed herein.

FIG. 13 is a plot of the illuminance at the observation plane, taken as a slice through the on-axis point, for a single LED/lens combination. The plot shows a relatively high value on-axis, and off-axis peaks that are slightly higher than the on-axis peak, by about 10% to 20%. Note that the off-axis peaks correspond to the Gaussian terms in the equation of FIG. 2. Beyond the off-axis peaks, the illuminance decays to a relatively small value. Note that for this design, the decay (corresponding to element 113 in FIG. 3) is roughly linear with distance along the observation plane. Note that the illuminance is rotationally symmetric in the observation plane, and FIG. 13 is merely a slice of the distribution, taken through the origin.

Figure 14:
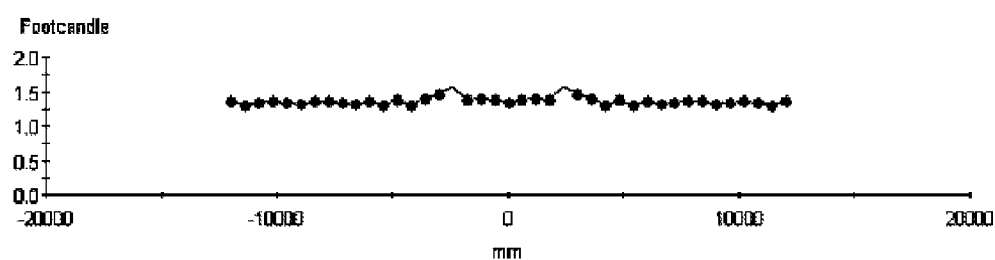
FIG. 14 is a plot of illuminance at the observation plane, taken as a slice through the on-axis point, for three spaced-apart LED/lens combinations according to embodiments disclosed herein.

Given the illuminance distribution for a single LED/lens combination in FIG. 13, the simulation is repeated for multiple LED/lenses. In this simulation, the LED/lenses are distributed in a line, with the lateral separation between adjacent LED/lenses being six times the longitudinal separation between the LED/lenses and the observation plane. Note that the longitudinal and lateral separations may also be scaled upwards or downwards, as long as the factor of six is maintained. A cross-section slice of calculated illuminance is shown in FIG. 14, with the slice being taken along the same direction as the LED/lenses. In other words, if the LED/lenses represent street lights along a street, then the plot of FIG. 14 is taken along the street, directly beneath the lights. FIG. 14 shows a highly uniform illuminance distribution along the slice, which is highly desirable. The decaying illuminance of one LED/lens is balanced well by the decaying illuminance of the adjacent LED/lens. Note that the illuminance is uniform only along the slice shown in FIG. 14. For a streetlight application, this means that the illuminance directly under the string of lights is roughly uniform, while the illuminance well off to the shoulder of the street has peaks and valleys. In general, the regions surrounding the poles on which the LED/lenses are suspended are illuminated brightly, while the midpoints between the poles tend to have a more narrow bright region.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. An optical system to angularly redistribute light from a light source, the light source defining a longitudinal axis, the optical system comprising:
   a lens having a proximal face and a distal face, wherein the distal face is opposite the proximal face and has a local maximum distal indentation coincident with the longitudinal axis, and wherein the proximal face includes a concave spherical indentation having its center at the light source;

wherein the lens has a central thickness defined as the longitudinal separation between the light source and the local maximum distal indentation;

wherein a radial cross-sectional slice of the distal face has a maximum distal protrusion spaced away from the longitudinal axis by a distance between 0.5 times the central thickness and 1.0 times the central thickness;

wherein at the maximum distal protrusion, the lens has a peak thickness defined as the longitudinal separation between the light source and the maximum distal protrusion, wherein the peak thickness is between 1.0 times the central thickness and 1.2 times the central thickness;

wherein a radial cross-sectional slice of the distal face has a location laterally coplanar with the local maximum distal indentation and spaced away from the longitudinal axis by a distance between 1.1 times the central thickness and 1.5 times the central thickness;

wherein the lens has a maximum lateral extent, from the longitudinal axis, between 1.6 times the central thickness and 1.9 times the central thickness; and wherein the lens receives light from the light source, then refracts the light through the proximal face of the lens, then transmits the light through the lens directly to the distal face of the lens, and then refracts the light through the distal face and out of the lens.

2. The optical system of claim 1, wherein the lens has a refractive index of 1.532 at a wavelength of 550 nm.

3. The optical system of claim 1, wherein the lens is made from COP.

4. The optical system of claim 1, wherein a radial cross-sectional slice of the distal face has a maximum distal protrusion spaced away from the longitudinal axis by a distance between 0.6 times the central thickness and 0.9 times the central thickness.

5. The optical system of claim 1, wherein a radial cross-sectional slice of the distal face has a maximum distal protrusion spaced away from the longitudinal axis by a distance between 0.6 times the central thickness and 0.8 times the central thickness.

6. The optical system of claim 1, wherein a radial cross-sectional slice of the distal face has a maximum distal protrusion spaced away from the longitudinal axis by a distance between 0.65 times the central thickness and 0.75 times the central thickness.

7. The optical system of claim 1, wherein the peak thickness is between 1.1 times the central thickness and 1.2 times the central thickness.

8. The optical system of claim 1, wherein the peak thickness is between 1.10 times the central thickness and 1.15 times the central thickness.

9. The optical system of claim 1, wherein the peak thickness is between 1.10 times the central thickness and 1.12 times the central thickness.

10. The optical system of claim 1, wherein a radial cross-sectional slice of the distal face has a maximum distal protrusion spaced away from the longitudinal axis by a distance between 0.6 times the central thickness and 0.9 times the central thickness.

11. The optical system of claim 1, wherein a radial cross-sectional slice of the distal face has a maximum distal protrusion spaced away from the longitudinal axis by a distance between 0.6 times the central thickness and 0.8 times the central thickness.

12. The optical system of claim 1, wherein a radial cross-sectional slice of the distal face has a maximum distal protrusion spaced away from the longitudinal axis by a distance between 0.65 times the central thickness and 0.75 times the central thickness.

13. The optical system of claim 1, wherein a radial cross-sectional slice of the distal face has a location laterally coplanar with the local maximum distal indentation and spaced away from the longitudinal axis by a distance between 1.2 times the central thickness and 1.5 times the central thickness.

14. The optical system of claim 1, wherein a radial cross-sectional slice of the distal face has a location laterally coplanar with the local maximum distal indentation and spaced away from the longitudinal axis by a distance between 1.25 times the central thickness and 1.45 times the central thickness.

15. The optical system of claim 1, wherein a radial cross-sectional slice of the distal face has a location laterally coplanar with the local maximum distal indentation and spaced away from the longitudinal axis by a distance between 1.3 times the central thickness and 1.4 times the central thickness.

16. The optical system of claim 1, wherein the lens has a maximum lateral extent, from the longitudinal axis, between 1.7 times the central thickness and 1.8 times the central thickness.

17. The optical system of claim 1, wherein the lens has a maximum lateral extent, from the longitudinal axis, between 1.65 times the central thickness and 1.7 times the central thickness.

18. The optical system of claim 1, wherein the proximal face is rotationally symmetric about the longitudinal axis.

19. The optical system of claim 1, wherein the distal face is rotationally symmetric about the longitudinal axis.

* * * * *